United States Patent [19]

Kemper et al.

[11] Patent Number: 5,591,416
[45] Date of Patent: Jan. 7, 1997

[54] STATIONARY SCREEN EXTRACTOR

[75] Inventors: Timothy G. Kemper, Piqua, Ohio; Allan L. Monroe, Sidel, Ill.; Tony L. Ritter, Sidney, Ohio

[73] Assignee: The French Oil Hill Machinery Co., Piqua, Ohio

[21] Appl. No.: 372,496

[22] Filed: Jan. 13, 1995

[51] Int. Cl.⁶ .......................... B01D 11/02; B01D 12/00
[52] U.S. Cl. .................. 422/268; 422/269; 422/272; 422/273; 422/275; 384/121; 384/420; 384/590
[58] Field of Search .................... 422/268, 269, 422/272, 273, 275; 384/121, 420, 590

[56] References Cited

U.S. PATENT DOCUMENTS

| | | | |
|---|---|---|---|
| 2,840,459 | 6/1958 | Karnofsky | 23/310 |
| 3,021,201 | 2/1962 | Upton | 23/272.5 |
| 3,062,626 | 11/1962 | Beck | 23/269 |
| 3,860,395 | 1/1975 | Kehse et al. | 23/269 |
| 4,125,379 | 10/1978 | Saxon | 422/269 |
| 4,307,064 | 12/1981 | Barger et al. | 422/267 |
| 4,376,052 | 3/1983 | Gessler | 210/511 |
| 4,390,506 | 6/1983 | Schumacher | 422/273 |
| 4,453,832 | 6/1984 | Schumacher et al. | 366/167 |

*Primary Examiner*—Nina Bhat
*Attorney, Agent, or Firm*—Biebel & French

[57] ABSTRACT

An improved rotating basket extractor is provided having improved discharge means comprising a hopper section having a solid material entry and solid material exit end. The cross sectional area of the solid material entry end is smaller than the exit end so as to help prevent the agglomeration of solid material in the discharge hopper as it exits from the rotating baskets to a dual screw conveyor for subsequent travel to a discharge chute. The discharge hopper and the housing for the dual screw conveyor comprise slot means to provide for additional drainage of miscella therethrough. Additionally, the axially disposed rotatable shaft, supporting the rotating baskets, is journalled in a thrust bearing provided contiguous to the flooring substrate. Location of the thrust bearing there helps to minimize bearing contamination and corrosion.

16 Claims, 3 Drawing Sheets

STATIONARY SCREEN EXTRACTOR

FIELD OF THE INVENTION

The present invention pertains to an improved stationary screen, rotatable basket extractor.

BACKGROUND OF THE INVENTION

It is well known in the art to extract a component such as an oil from a solid material by grinding the material to form grains or flakes and then passing a solvent through the granular material to separate the extractable component via solvent extraction. Commonly, the granular material is processed in batches. In one form of operation, the batches of the granular material, such as soybeans, are fed into cells or baskets near a feed station. The cells move along a circular path from the feed station toward a discharge station, where the processed granular material is discharged. Miscella, or solvent which has passed at least once through the granular material, drains from the cells by gravity and collects in pans beneath the cells for reuse or discharge.

In order to extract the desired component as completely as possible from the granular material, it is common to expose the granular material to solvent or miscella at multiple fluid feed stations along the circular path. For example, it is known to introduce the miscella into the cells in a "counterflow" fashion such that the miscella is collected after it has percolated through the solid material. Pure solvent is introduced at the last fluid feed station along the circular path, while miscella drained from a cell at the first fluid feed station along the circular path is collected and discharged to an evaporator or the like to effect isolation of the desired material.

Once the extraction process has been completed, the granular material must be collected and conveyed out of the system. It is common to discharge the granular material out of the cells into a hopper at the end of the extraction process. Unfortunately, the granular material (which is still at least wet with the solvent) tends to stick to the sides of the hopper or to aggregate. As a result, the granular material often fails to flow smoothly to a screw or other conveyor at the bottom of the hopper. In some systems, agitators are provided to loosen the granular material so that it flows smoothly to the bottom of the hopper. Such agitators, which are typically motorized, add to the expense and maintenance requirements of the extractor.

Even after discharge of the solid material into the discharge hopper or the like, unrecovered miscella still exists therein.

Additionally in those extraction systems in which the cells are supported for rotation around a central, vertically disposed axial shaft, axial support bearings that are located in or adjacent to miscella drainage reservoirs as the granular material carrying cells are susceptible to contamination so that the extraction units must be shut down periodically for cleaning.

Accordingly, there remains a need in the art for the provision of an extractor having a discharge unit constructed in such manner as to minimize the tendency of the discharged solid material from agglomerating at the discharge area or along discharge chute walls and the like. There is an even more specific need to provide a discharge device that provides for improved miscella removal.

Additionally, in those structures in which rotatable baskets are structured for rotation about a centrally disposed axial shaft, there is a need to provide a thrust bearing to journal the shaft, which bearing is located remote from the miscella collection receiver and the grain carrying cells so as to minimize the possibility of bearing contamination.

SUMMARY OF THE INVENTION

These and other objects are met by the improved stationary screen extractor disclosed herein.

Briefly, the invention comprises improvement in rotating basket type extractor units. It includes a continuous, flat fixed slotted bottom positioned under the rotating baskets. The axial shaft around which the baskets rotate is supported by a single central bearing to support the weight of both the material processed and the rotatable structure. This combination provides improved reliability by decreasing torque requirement in contrast to many of the prior art structures.

The single, centrally located bearing is located at floor level rather than at the inner edge of the grain containing cone as set forth in prior art U.S. Pat. No. 3,062,626. This, in turn, allows a mechanical seal to be positioned at the inner edge of the miscella collection pan to prevent solvent leaks and bearing contamination. The bearing is located near the floor rather than on a support truss to help reduce vertical deflection of the rotating basket assembly which will prevent uneven rack and pinion alignment and subsequent vibration.

Additional improvement resides in the solids discharge means and associated conveyor means, which, together, allow for discharge of the granular material without excessive accumulation thereof at the discharge entry. This is accomplished by provision of a housed discharge structure which, in cross sectional area, is smaller at the entry end with diverging wall members defining a larger cross sectional area at the downstream or exit section of the discharge unit. Additionally, slots are provided in at least one of the vertically inclined walls of the discharge unit so as to allow for the horizontal flow or drainage of retained miscella from the solids discharge area into a miscella collection conduit or the like.

Still further, after the material has been discharged from the rotating cells and has travelled through the above described discharge unit, it is gravity fed to a dual screw conveyor means adapted to shear and convey the solid material to a discharge chute. One of the screws is provided with right hand threads with the other screw having left hand threads. The screws are rotated in opposite directions and accordingly, in addition to conveying the solid material to the discharge chute, they provide a kneading or shearing action to the material, thereby liberating additional miscella. The dual screws are mounted in a housing which housing comprises at least one vertically inclined slotted wall member so as to provide an additional site for miscella drainage from the extractor unit.

The invention will be further described in conjunction with the appended drawings and following detailed description.

DESCRIPTION OF THE PREFERRED EMBODIMENT

Figure 1:
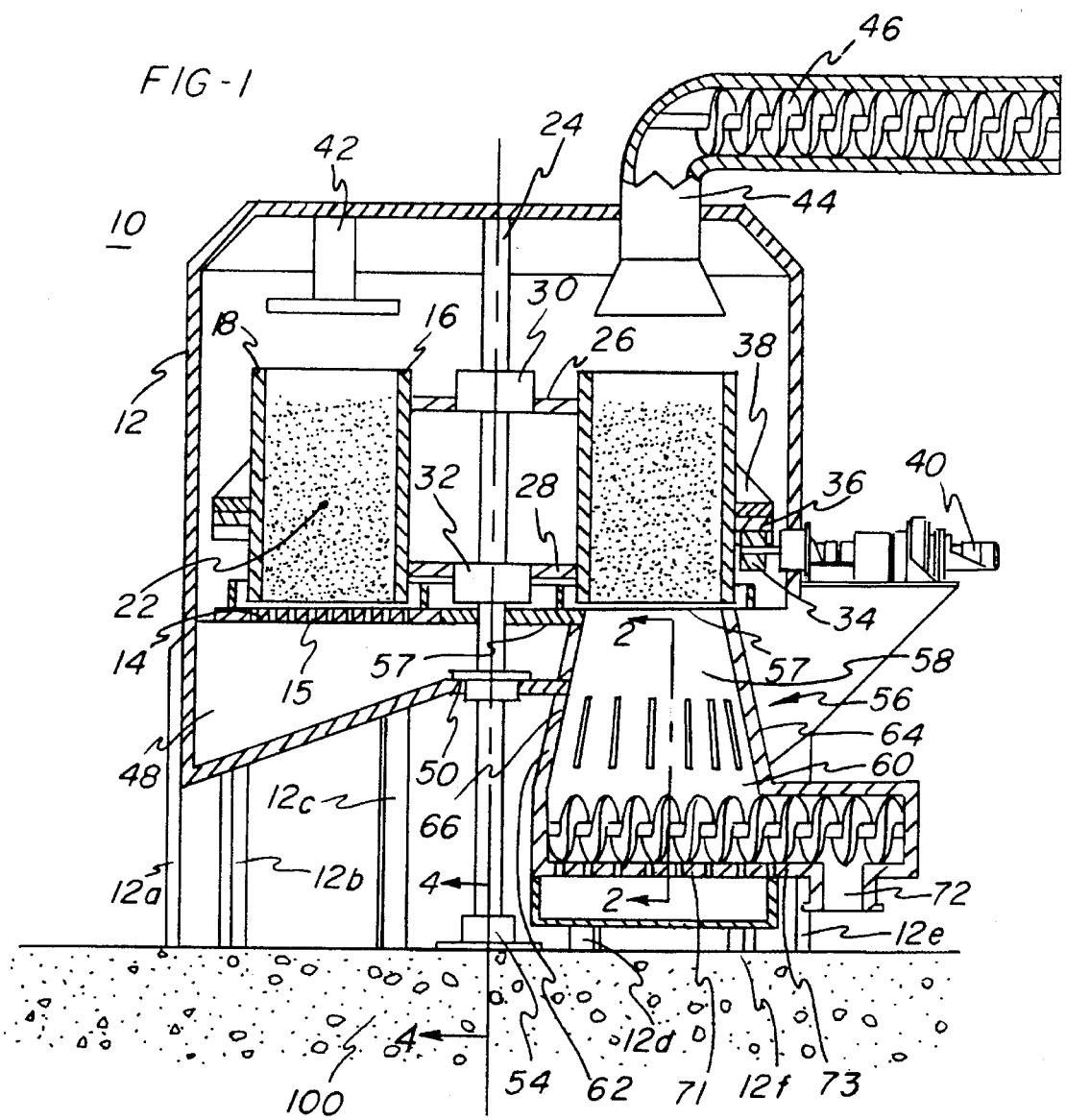
FIG. 1 is a vertical section view of an improved extractor in accordance with the invention.

Turning now to FIG. 1, there is shown extractor 10 comprising outer housing member 12 fixedly supported in flooring via supports 12a, 12b, 12c, 12d, 12e and 12f. The extractor is of the type having a plurality of baskets provided for rotational movement around a central axis. The baskets receive liquid solvent such as hexane and/or miscella and discharge the miscella through a screen or the like. Upon completion of rotational travel around the central axis, the basket dumps the solid extractable material into a discharge device or the like. Devices of this general type are disclosed in U.S. Pat. Nos. 2,840,459 (Karnofsky) and 3,860,395 (Kense et al.), the entire disclosures of which are hereby incorporated by reference.

With further regard to FIG. 1 of the drawings, stationary, fluid permeable screen 14 is shown disposed under the bottom of the baskets. Screen 14 comprises a multiplicity of slot members 15 therein through which miscella passes to miscella collection pan 48. The slots are about 0.080 inches in width and extend circumferentially around the vertically disposed axial shaft.

The baskets 22 or cells are defined by inner and outer annular walls 16,18, respectively. It is noted that for each cell forward and trailing radially extending walls (not shown) are provided so as to constitute a perimeter or housing for the cell.

The cells are mounted for rotation around axial shaft 24 by the provision of support brackets 26, 28 received within cross brace members 30, 32 respectively. The cells are rotated by means of a rack and pinion type drive comprising pinion gear 34 driven via motor 40. Pinion 34 engages ring gear 36 which is fixedly secured to rail member 38 which in turn is formed integrally with wall 18 so as to impart rotation to the cells.

Liquid solvent, such as hexane, is fed to the cells via feed conduit 42. Extractable granular solid material is fed to the cells via conduit 44, via action of auger 46 disposed therein.

Seal member 50 surrounds axial shaft at the location of miscella collection pan 48. Bearing 52 is disposed underneath of this seal.

Thrust bearing 54 is provided contiguous with a flooring substrate or floor member 100 in a location that is remote from the miscella collection pan 48 and the cells 22. This is a distinct improvement over prior art devices in that this seal will not become contaminated with miscella and the like as with other granular material which often occurred when the central thrust bearing for the rotating basket carousel was located either in or closely spaced from the miscella collection conduit or pan or close to the grain containing cells. Also, location of the bearing contiguous to the flooring rather than on a support truss reduces vertical deflection of the carousel, which prevents uneven rack and pinion alignment and subsequent vibration.

Discharge hopper 56 is provided in communication with an opening in the stationary floor member 57 disposed underneath the rotating baskets or cells. As shown in FIG. 1, an entry section 58 of the hopper is provided directly under this opening with an exit section 60 of the hopper disposed downwardly from entry section 58. Vertically extending hopper walls 62, 64, are spaced from each other and diverge as they extend downwardly toward exit section 60 of the hopper. Accordingly, the cross sectional area of the hopper in entry section 58 is less than that presented in exit section 60 of the hopper. This helps to prevent "bridging" and excessive agglomeration of the discharged granular material that occurs with some of the prior art discharge devices.

Again, as can be seen in FIG. 1, hopper wall 62 is provided with slots 66 therein. These slots provide drainage sites for horizontal flow of miscella with the slots draining into a collection trough or the like (not shown).

After travel of the solid extractable material through the entry section and exit section 58, 60 respectively of discharge hopper 56, the material is worked and forwarded to discharge chute 72 of the extractor by a dual screw conveyor. Slots 71 are provided in the bottom wall 73 of the housing surrounding the screws to provide additional drainage of miscella.

Figure 2:
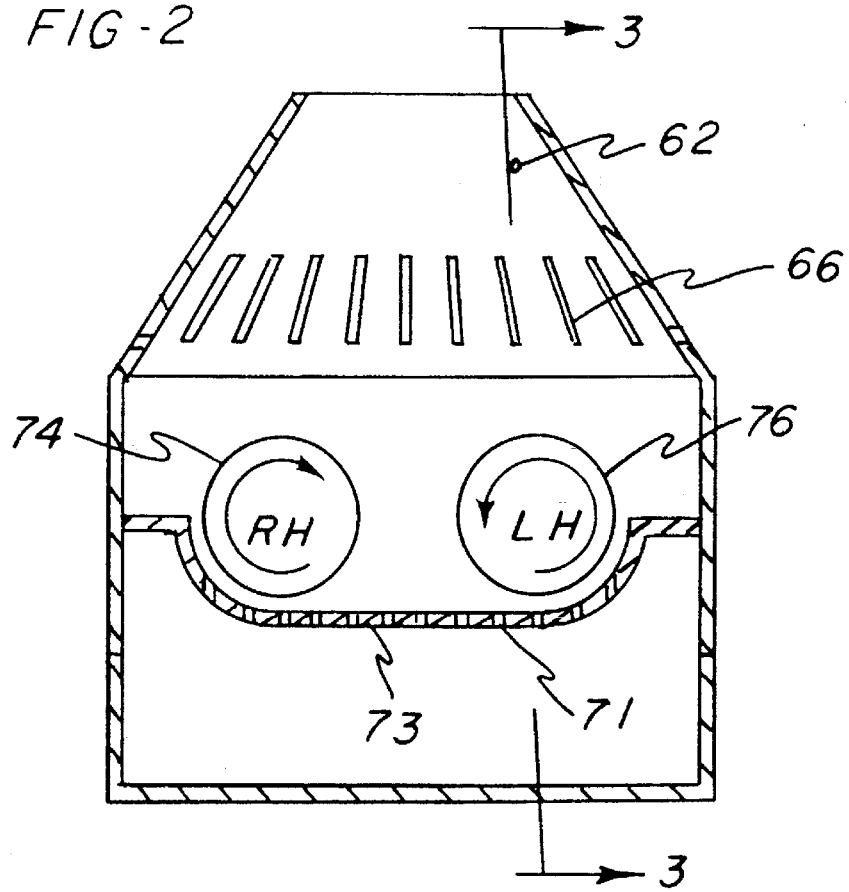
FIG. 2 is a sectional view of the solids discharge hopper taken along the plane 2—2 as shown by the line and arrows of FIG. 1.

Turning now to FIG. 2, there is shown a portion of the discharge hopper and associated screw conveyor. Here, wall 62 comprises slot members 66 as previously described. At the bottom end of the hopper, a screw conveyor means is provided comprising dual screws. Screws 74 and 76 are shown in cross-section. Screw 74 is provided with right hand extending screw flights (right hand pitch) and screw 76 is provided with left hand extending screw flights (left hand pitch). These screws are rotated in opposite rotational directions to therefore mechanically knead or work the solid extractable material and to ultimately advance same to discharge chute 72 (FIG. 1).

Figure 3:
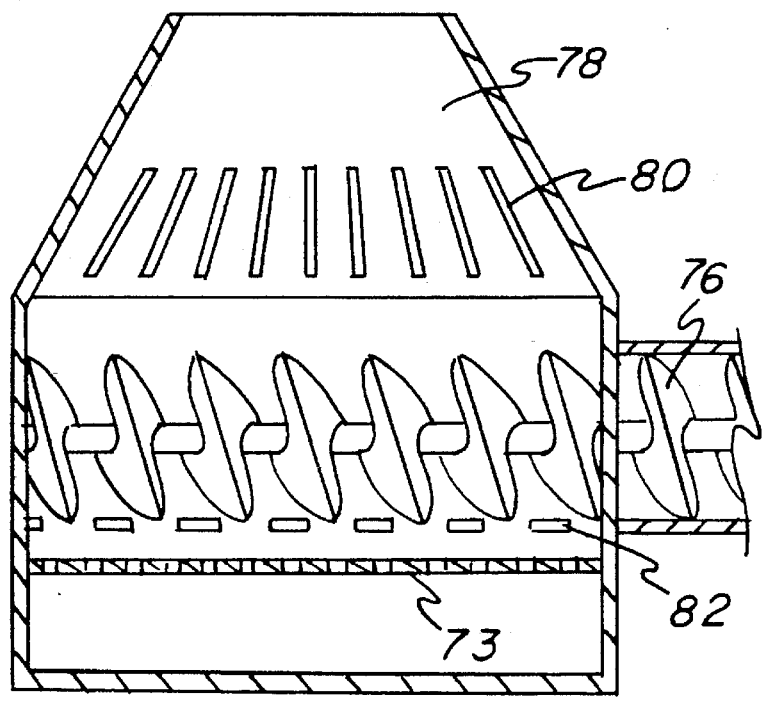
FIG. 3 is a sectional view of the solids discharge hopper taken along the plane 3—3 as shown by the line and arrows of FIG. 2.

Additionally, as can be seen in FIG. 3, slots 80 are provided in rear, radially extending wall 78 of the hopper. (The leading or front radial wall of the hopper is not shown). Slots 82 are also provided in the rear radially extending wall section proximate the dual screw conveyor. Again, these slots provide for drainage of miscella into suitable collection devices (not shown).

Figure 4:
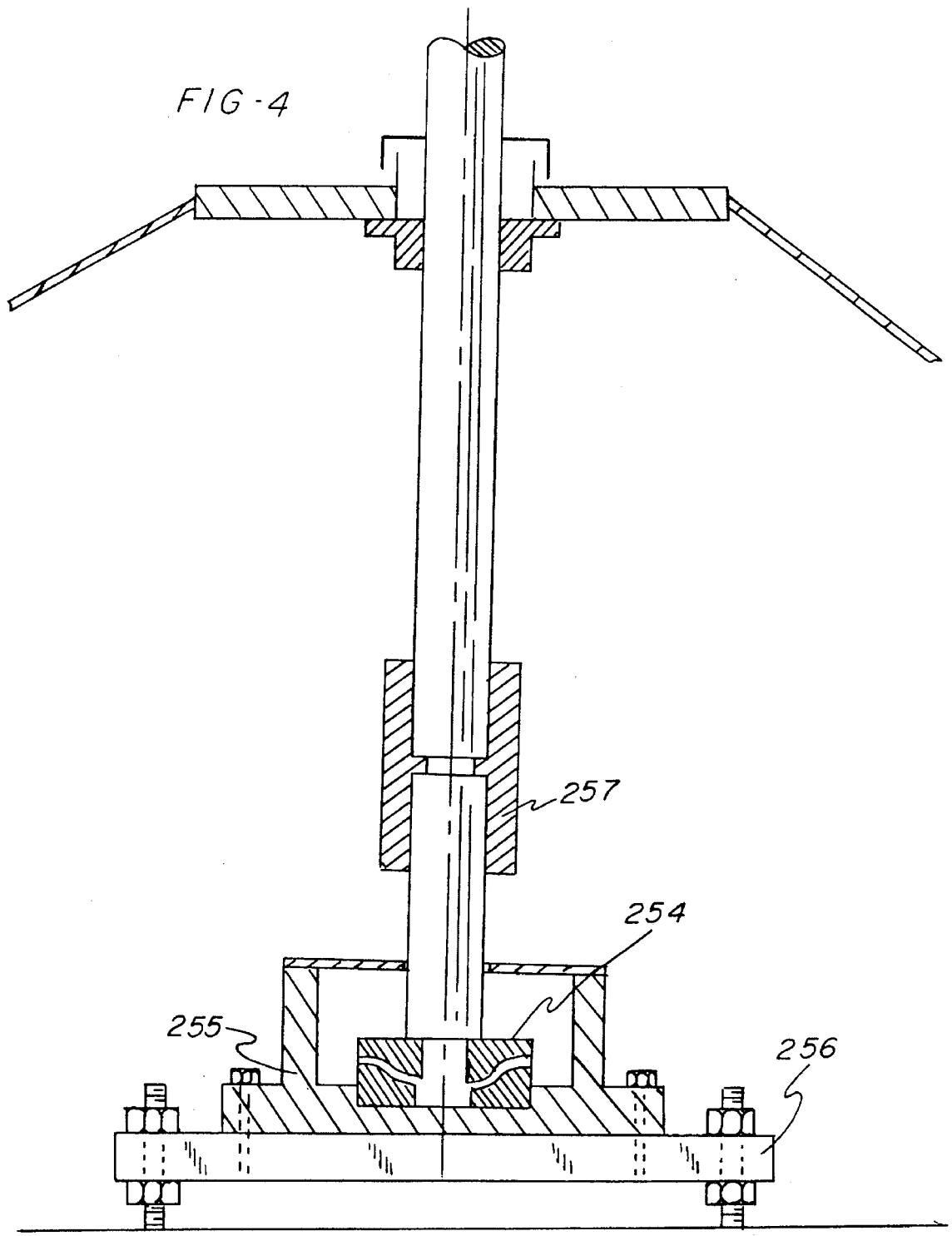
FIG. 4 is a sectional view of the central thrust bearing taken along the plane 4—4 as shown by the line and arrows 4—4 of FIG. 1.

Turning now to FIG. 4, there is shown the single, centrally located bearing located at floor level comprising a spherical roller thrust bearing 254 mounted in a bearing pot 255 which is located on an adjustable base plate 256. Coupling 257 directly above allows removal of the lower shaft segment 238 for ease in bearing removal and installation.

What it claimed is:

1. In a basket extractor of the type adapted to process extract bearing solid material from an upstream to downstream direction and having a plurality of cell members adapted to receive said extract bearing solid material, means for feeding said solid material to said cell members, means for feeding liquid solvent to said cell members, and screen means cooperating with said cell members for providing drainage of said liquid solvent and extractable material from said solid material to thereby separate said liquid solvent and said extractable material from said solid material, the improvement comprising discharge means positioned proximate said screen means and downstream from said means for feeding said solid material and said liquid solvent to said cell members for discharging separated solid material from said cell members, said discharge means comprising a hopper including an entry section and an exit section, said entry section having a cross sectional area smaller than the cross sectional area of said exit section wherein said hopper comprises a pair of opposed vertically inclined wall members, said opposed wall members extending from said entry section of said hoppper into said hopper exit section, said wall members being more closely spaced to each other in said entry section than in said exit section and wherein said wall members each comprises slots formed therein adapted to provide for additional drainage of said liquid solvent and said extractable material therethrough and to thereby provide further separation of said liquid solvent and said extractable material from said solid material.

2. Improved basket extractor as recited in claim 1 wherein said hopper comprises a second pair of opposed vertically inclined wall members, said first pair of wall members and said second pair of wall members interconnected to define a housing for said hopper.

3. Improved basket extractor as recited in claim 1 in combination with screw conveyor means positioned adjacent said exit section of said hopper for receiving said solid materials from said exit section of said hopper, said screw conveyor means comprising dual screw conveyor means for transporting said solid material from said hopper exit end to a discharge chute.

4. Improved basket extractor as recited in claim 3 wherein one of said screws of said dual screw conveyor has right hand screw flights and said other of said screws of said dual screw conveyor has left hand flights.

5. Improved basket extractor as recited in claim 3 wherein said dual screw conveyor means comprises a housing with said dual screw conveyor means positioned in said housing, said housing comprising a plurality of interconnected vertically inclined wall members, at least one of said wall members comprising slots formed therein adapted to provide for additional drainage of said liquid solvent and said extractable material therethrough and to thereby provide further separation of said liquid solvent and said extractable material from said solid material.

6. Improved basket extractor as recited in claim 1 wherein said discharge means is positioned contiguous to said screen means.

7. Rotatable basket extractor for separating liquid solvent and miscella from a solid material and having a plurality of cell members adapted for rotation about a generally vertically disposed axial shaft with one end of said shaft abutting a flooring substrate, a stationary screen member underneath said cell members for separating said liquid solvent and miscella from said solid material, a stationary fluid collection pan disposed under said screen with said shaft passing axially through said pan, a thrust bearing contiguous to said flooring and outside of said collection pan, said end of said shaft in abutting relation to said flooring substrate being journalled in said thrust bearing.

8. Rotatable basket extractor as recited in claim 7 further comprising sealing means on said axial shaft located above said thrust bearing and sealing said fluid collection pan along said axial shaft.

9. Rotatable basket extractor as recited in claim 7 further comprising means for feeding said solid material to said cells, means for feeding said liquid solvent to said cells, and discharge means for discharging said separated solid material from said cells, said discharge means comprising a stationary hopper including an entry section and an exit section, said entry section having a cross-sectional area smaller than the cross-sectional area of said exit section.

10. Rotatable basket extractor as recited in claim 9 wherein said hopper comprises a pair of opposed vertically inclined wall members, said opposed wall members extending from said entry section of said hopper into said hopper exit section, said wall members being spaced more closely to each other in said entry section than in said exit section.

11. Rotatable extractor as recited in claim 10 wherein said wall members each comprise slots formed therein adapted to provide for additional separation of said liquid solvent and said extractable material from said solid material.

12. Rotatable extractor as recited in claim 11 wherein said hopper comprises a second pair of opposed vertically inclined wall members, said first pair of wall members and said second pair of wall members interconnected to define a housing for said hopper.

13. Rotatable basket extractor as recited in claim 9 in combination with screw conveyor means positioned adjacent said exit section of said hopper for receiving said solid materials from said exit section of said hopper, said screw conveyor means comprising dual screw conveyor means for transporting said solid material from said hopper exit end to a discharge chute.

14. Rotatable basket extractor as recited in claim 13 wherein one of said screws of said dual screw conveyor has right hand screw flights and said other of said screws of said dual screw conveyor has left hand flights.

15. Rotatable basket extractor as recited in claim 13 wherein said dual screw conveyor means comprises a housing with said dual screw conveyor means positioned in said housing, said housing comprising a plurality of interconnected vertically inclined wall members, at least one of said wall members comprising slots formed therein adapted to provide for additional separation of said liquid solvent and said extractable material from said solid material.

16. Rotatable extractor as recited in claim 7 including a rack-and-pinion drive comprising a motor, a pinion gear drivably coupled to said motor, and a ring gear in meshing engagement with said pinion gear, said ring gear being fixed to said plurality of cell members to rotate said plurality of cell members about said shaft.

* * * * *

UNITED STATES PATENT AND TRADEMARK OFFICE
CERTIFICATE OF CORRECTION

PATENT NO. : 5,591,416
DATED : Jan. 7, 1997
INVENTOR(S) : Timothy G. Kemper, Allan L. Monroe and Tony L. Ritter It is certified that error appears in the above-indentified patent and that said Letters Patent is hereby corrected as shown below:

On the title page:

Item: [73] Assignee: The French Oil Hill Machinery Co.

Should be --The French Oil Mill Machinery Co.

Signed and Sealed this

Twenty-second Day of April, 1997

Attest:

BRUCE LEHMAN

*Commissioner of Patents and Trademarks*

*Attesting Officer*